US012596365B2

(12) United States Patent
Fang et al.

(10) Patent No.:    US 12,596,365 B2
(45) Date of Patent:        Apr. 7, 2026

(54) ENHANCEMENTS TO BEYOND-VISUAL-LINE-OF-SIGHT (BVLOS) OPERATION OF REMOTE-CONTROLLED APPARATUSES

(71) Applicant: T-Mobile USA, Inc., Bellevue, WA (US)

(72) Inventors: Zheng Fang, McLean, VA (US); George Jason Schnellbacher, Leawood, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 380 days.

(21) Appl. No.: 18/314,514

(22) Filed: May 9, 2023

(65) Prior Publication Data

US 2024/0377822 A1      Nov. 14, 2024

(51) Int. Cl.
*G05D 1/00*        (2024.01)
*B64C 39/02*        (2023.01)
(Continued)

(52) U.S. Cl.
CPC ......... *G05D 1/0038* (2013.01); *B64C 39/024* (2013.01); *G05D 1/0022* (2013.01);
(Continued)

(58) Field of Classification Search
CPC ............ B64U 2101/30; B64U 2101/20; B64U 10/13; B64U 2201/10; B64U 2201/104;
(Continued)

(56) References Cited

U.S. PATENT DOCUMENTS 9,335,764 B2      5/2016   Herz et al.
9,738,382 B2      8/2017   Brulez et al.
(Continued)

FOREIGN PATENT DOCUMENTS

CN        105222761 A      1/2016
CN        106444810 A      2/2017
(Continued)

OTHER PUBLICATIONS

Extended European Search Report for EP Appl. Ser. No. 24175268.2 mailed Aug. 9, 2024 (12 pages).
(Continued)

*Primary Examiner* — Redhwan K Mawari
(74) *Attorney, Agent, or Firm* — Perkins Coie LLP

(57)                ABSTRACT

Beyond-visual-line-of-sight (BVLOS) control of drones is enhanced using wireless communication via a cellular network. In an example system, a drone and a remote control station are configured to communicate via a 5G network. Drone control is further enhanced with extended reality (XR) display. Video stream data captured by the drone is replaced, supplemented, and/or overlaid with XR visual data in an XR environment. The XR visual data corresponds to a perspective from a virtual location in the XR environment that mirrors a real-world location of the drone. This lightens constraints and requirements associated with the network communication of video stream data from the drone for BVLOS control of the drone. Drone control is further enhanced with voice command capability. A user vocally utters a coarse-resolution or abstract command, and a drone control station translates the utterance into a sequence of fine-resolution drone commands that implement the vocally-uttered command.

10 Claims, 8 Drawing Sheets

(51) Int. Cl.
    *G06F 3/16*            (2006.01)
    *G06F 40/40*        (2020.01)
    *B64U 101/30*      (2023.01)

(52) U.S. Cl.
    CPC .......... *G05D 1/0044* (2013.01); *G05D 1/101*
        (2013.01); *G06F 3/167* (2013.01); *G06F*
        *40/40* (2020.01); *B64U 2101/30* (2023.01);
        *B64U 2201/20* (2023.01)

(58) Field of Classification Search
    CPC ............ B64U 2201/20; B64U 2101/00; G05D
                         1/0038; G05D 1/0088
    See application file for complete search history.

(56)                References Cited

U.S. PATENT DOCUMENTS

| | | | |
|---|---|---|---|
| 9,747,725 | B2 | 8/2017 | Seydoux et al. |
| 9,886,033 | B2 | 2/2018 | Seydoux et al. |
| 10,262,465 | B2 | 4/2019 | Wright et al. |
| 10,572,000 | B2 | 2/2020 | Cossairt et al. |
| 11,115,112 | B2 | 9/2021 | Christomanos |
| 11,409,280 | B1 | 8/2022 | Lesonen et al. |
| 2009/0169102 | A1* | 7/2009 | Zhang ...................... G06T 5/70 |
| | | | 382/167 |
| 2018/0290748 | A1* | 10/2018 | Corban ................. G06T 19/006 |
| 2019/0088025 | A1* | 3/2019 | Tamanaha ............. G06F 3/0484 |
| 2020/0106818 | A1* | 4/2020 | Luong ..................... H04L 67/12 |
| 2020/0302510 | A1* | 9/2020 | Chachek ................ G06V 20/52 |
| 2021/0092604 | A1* | 3/2021 | Fox ....................... H04L 9/0891 |
| 2022/0293001 | A1 | 9/2022 | Choi et al. |
| 2022/0386147 | A1* | 12/2022 | Majjiga .................... G08G 5/22 |
| 2023/0064973 | A1 | 3/2023 | Ceballos Melo |
| 2023/0071981 | A1 | 3/2023 | Shapira et al. |
| 2023/0167653 | A1* | 6/2023 | Waters ................... B64U 80/25 |
| | | | 244/114 R |
| 2023/0168858 | A1* | 6/2023 | Shute ...................... G06F 3/011 |

FOREIGN PATENT DOCUMENTS

| | | | | | |
|---|---|---|---|---|---|
| CN | 106257543 | B | 1/2019 | | |
| CN | 208367541 | U | 1/2019 | | |
| CN | 209037845 | U | 6/2019 | | |
| CN | 111651036 | A | 9/2020 | | |
| CN | 112180963 | A | 1/2021 | | |
| EP | 3221771 | A1 | 9/2017 | | |
| EP | 3417338 | A1 | 12/2018 | | |
| EP | 3547059 | A1 | 10/2019 | | |
| EP | 3736667 | A1 | 11/2020 | | |
| EP | 3762190 | A1 | 1/2021 | | |
| EP | 3491494 | B1 | 12/2021 | | |
| KR | 101790592 | B1 | 11/2017 | | |
| KR | 20180025416 | A | 3/2018 | | |
| KR | 101845796 | B1 | 4/2018 | | |
| KR | 101894409 | B1 | 9/2018 | | |
| KR | 102068500 | B1 | 1/2020 | | |
| KR | 102146264 | B1 | 8/2020 | | |
| KR | 20200106818 | A | * | 9/2020 | .......... H01Q 9/0414 |
| KR | 20210092604 | A | * | 7/2021 | .............. B21D 1/02 |
| KR | 102331974 | B1 | 12/2021 | | |
| KR | 102502022 | B1 | 2/2023 | | |
| WO | 2018090505 | A1 | 5/2018 | | |
| WO | 2018222499 | A1 | 12/2018 | | |
| WO | 2018224847 | A2 | 12/2018 | | |
| WO | 2020229841 | A1 | 11/2020 | | |
| WO | 2021203210 | A1 | 10/2021 | | |

OTHER PUBLICATIONS

Bor-Yaliniz, et al., "Is 5G Ready for Drones: A Look into Contemporary and Prospective Wireless Networks from a Standardization Perspective", IEEE Wireless Communications, Coordinated Science Laboratory; University of Illinois at Urbana-Champaign, US, vol. 26, No. 1, Feb. 1, 2019, pp. 18-27, XP011709548, ISSN: 1536-1284, DOI: 10.1109/MWC.2018.1800229 (12 pages).

* cited by examiner

304

402

404

308

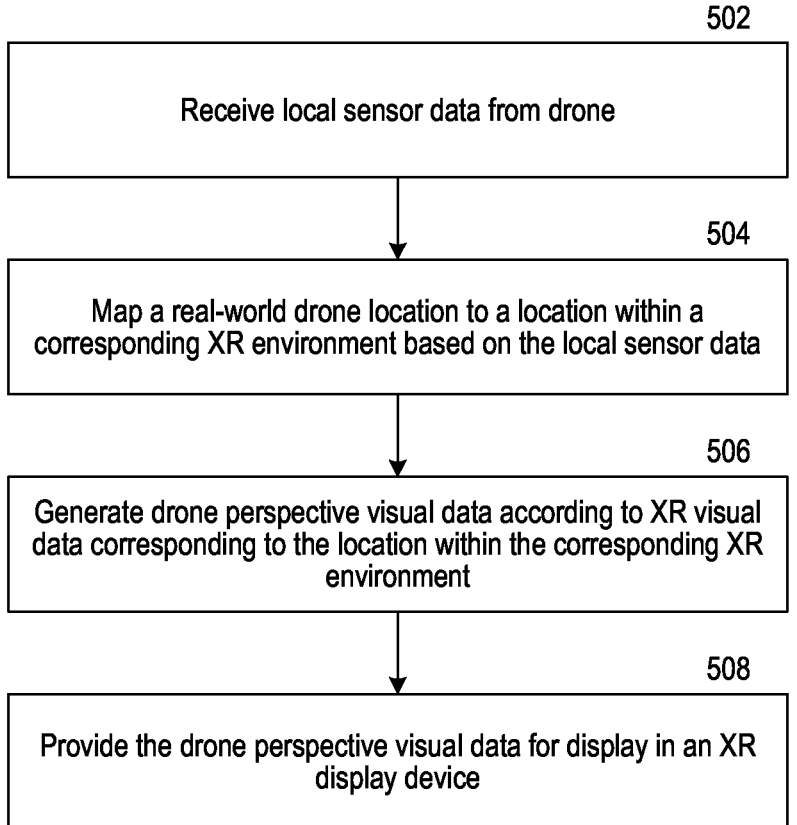

502

Receive local sensor data from drone

504

Map a real-world drone location to a location within a corresponding XR environment based on the local sensor data

506

Generate drone perspective visual data according to XR visual data corresponding to the location within the corresponding XR environment

508

Provide the drone perspective visual data for display in an XR display device

FIG. 5

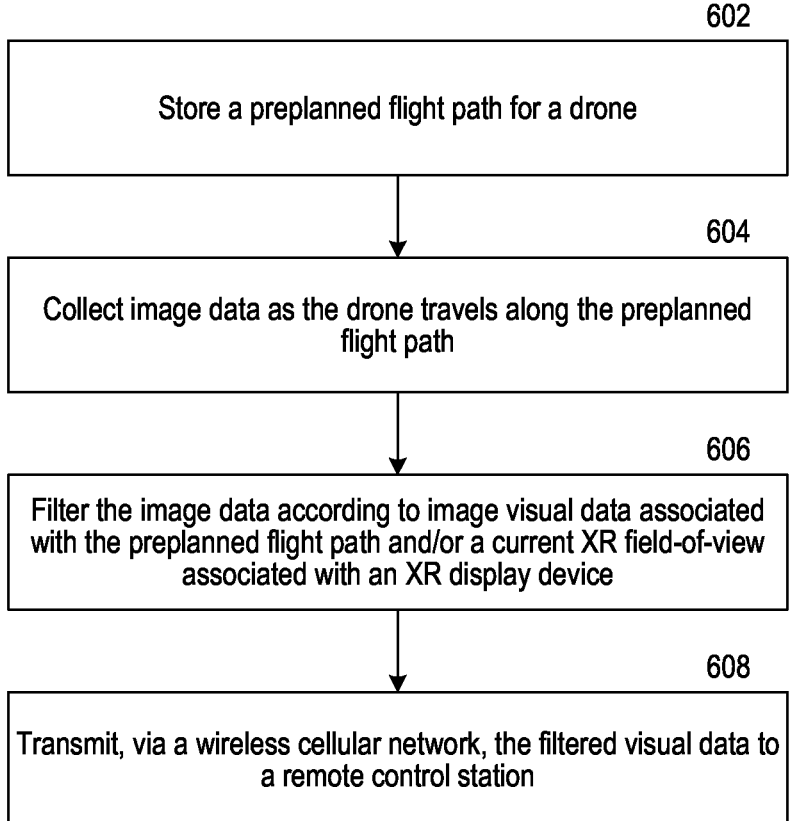

602

Store a preplanned flight path for a drone

604

Collect image data as the drone travels along the preplanned flight path

606

Filter the image data according to image visual data associated with the preplanned flight path and/or a current XR field-of-view associated with an XR display device

608

Transmit, via a wireless cellular network, the filtered visual data to a remote control station

Train a command translation model for a drone operator

704

Receive audio data that includes an utterance related to a drone operation

706

Map, via the command translation model, the utterance to a sequence of drone commands that an onboard computer of the drone is configured to interpret

708

Transmit the sequence of drone commands to the onboard computer of the drone

ENHANCEMENTS TO BEYOND-VISUAL-LINE-OF-SIGHT (BVLOS) OPERATION OF REMOTE-CONTROLLED APPARATUSES

BACKGROUND

Wireless communication enables the operation and control of apparatuses, drones, vehicle, machinery, and the like from a remote location. However, wireless communication is constrained by signal propagation characteristics, network configurations, signal and network bandwidth, and more. These constraints place limits on a reliability, range, and latency of the remote operation and control of the apparatuses, for example, at farther distances.

BRIEF DESCRIPTION OF THE DRAWINGS

Detailed descriptions of implementations of the present invention will be described and explained through the use of the accompanying drawings.

FIG. 5 is a flow diagram that illustrates example operations for XR-based improvements to remote/BVLOS drone operation via a wireless cellular network.

FIG. 6 is a flow diagram that illustrates example operations for XR-based improvements to remote/BVLOS drone operation via a wireless cellular network.

DETAILED DESCRIPTION

Figure 1:
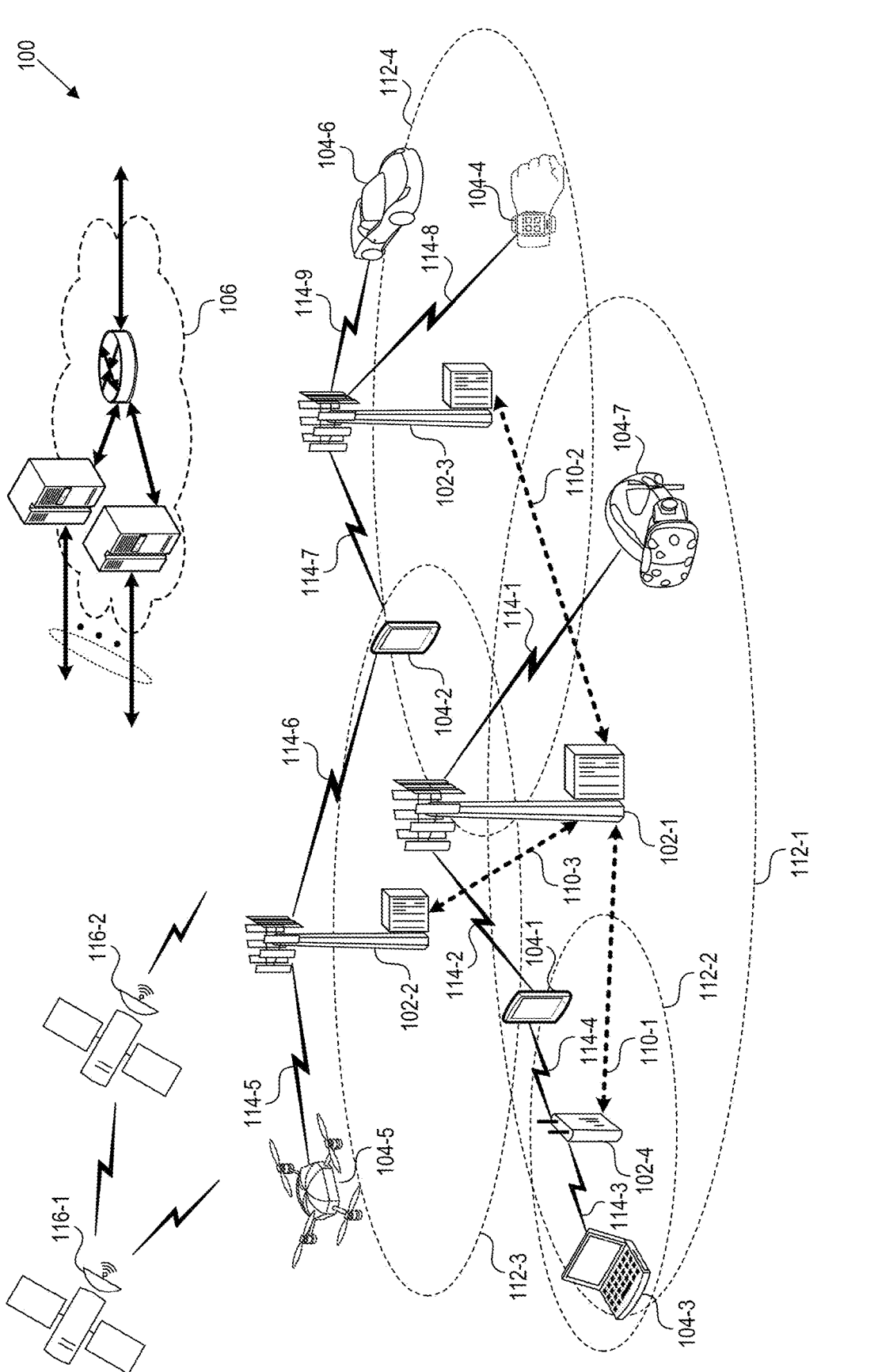
FIG. 1 is a block diagram that illustrates a wireless communications system that can implement aspects of the present technology.

The disclosed technology relates to improvements to remote and beyond-visual-line-of-sight (BVLOS) operation of remote-controlled apparatuses, such as drones, vehicles, machinery, and the like. Example implementations leverage wireless cellular or telecommunication networks, which span large geographic areas, for communication between a remote operator and a drone, for example. Thus, operational range of remote-controlled apparatuses is expanded beyond limits associated with local area networks and peer-to-peer communications, for example. Further, example implementations provide techniques for reducing network load and bandwidth of a wireless cellular network when commanding and controlling a drone, based on using virtual extended reality (XR) environments to supplement video stream data from the drone.

The present disclosure also provides voice-based improvements to the control of drones, for example. Voice commands from a remote operator are translated via natural language processing (NLP) models and/or machine learning (ML) models to a set/sequence of drone commands, which are then sent to an autonomous or semi-autonomous drone. Voice-based techniques disclosed herein enable diversification of simultaneous inputs for drone operation and reduce a number of operator actions or inputs needed to maneuver or navigate a drone. While the discussion herein may use the example of a drone, one of skill in the art would understand that the disclosed technology can apply to any remote-controlled apparatus.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples. Further, those skilled in the art will recognize that alternative implementations can be employed without departing from the principles of the present technologies. Accordingly, while specific implementations are shown in the drawings, the technology is amenable to various modifications.

Example Wireless Communications Systems

FIG. 1 is a block diagram that illustrates a wireless telecommunications network 100 ("network 100") in which aspects of the disclosed technology are incorporated. For example, the wireless telecommunications network 100 provides communication services between a remote control station (e.g., a ground control station or GCS) and remote controlled apparatuses, such as a drone vehicle, a stationary machinery (e.g., an articulated robotic arm), and unmanned land vehicle, or the like. For the purposes of this disclosure, example implementations are described with reference to drones or drone vehicles, but it will be understood that disclosed implementations can be applicable to other remote controlled apparatuses and machines. According to example implementations, the drone vehicle and the remote control station communicate with each other via the wireless telecommunications network 100, and the present disclosure provides technical improvements at least with respect to the communication capabilities and capacity of the wireless telecommunications network 100 and to the operation of the drone vehicle by the remote control station.

The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context. A wireless telecommunications network 100 can also be referred to herein as a wireless cellular network.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, and the like. Drone vehicles and remote/ground control stations as disclosed herein are wireless devices 104 that can connect to and communicate via the wireless telecommunications network 100.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications. As discussed herein, example implementations improve the remote operation and communication between a remote control station and a drone vehicle that can travel across different distances and areas. In some examples, the drone vehicle is located in cell edge conditions or locations, and the present disclosure improves the operation thereof in light of network communication constraints associated with such cell edge conditions or locations.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Example 5G Core Network Functions

Figure 2:
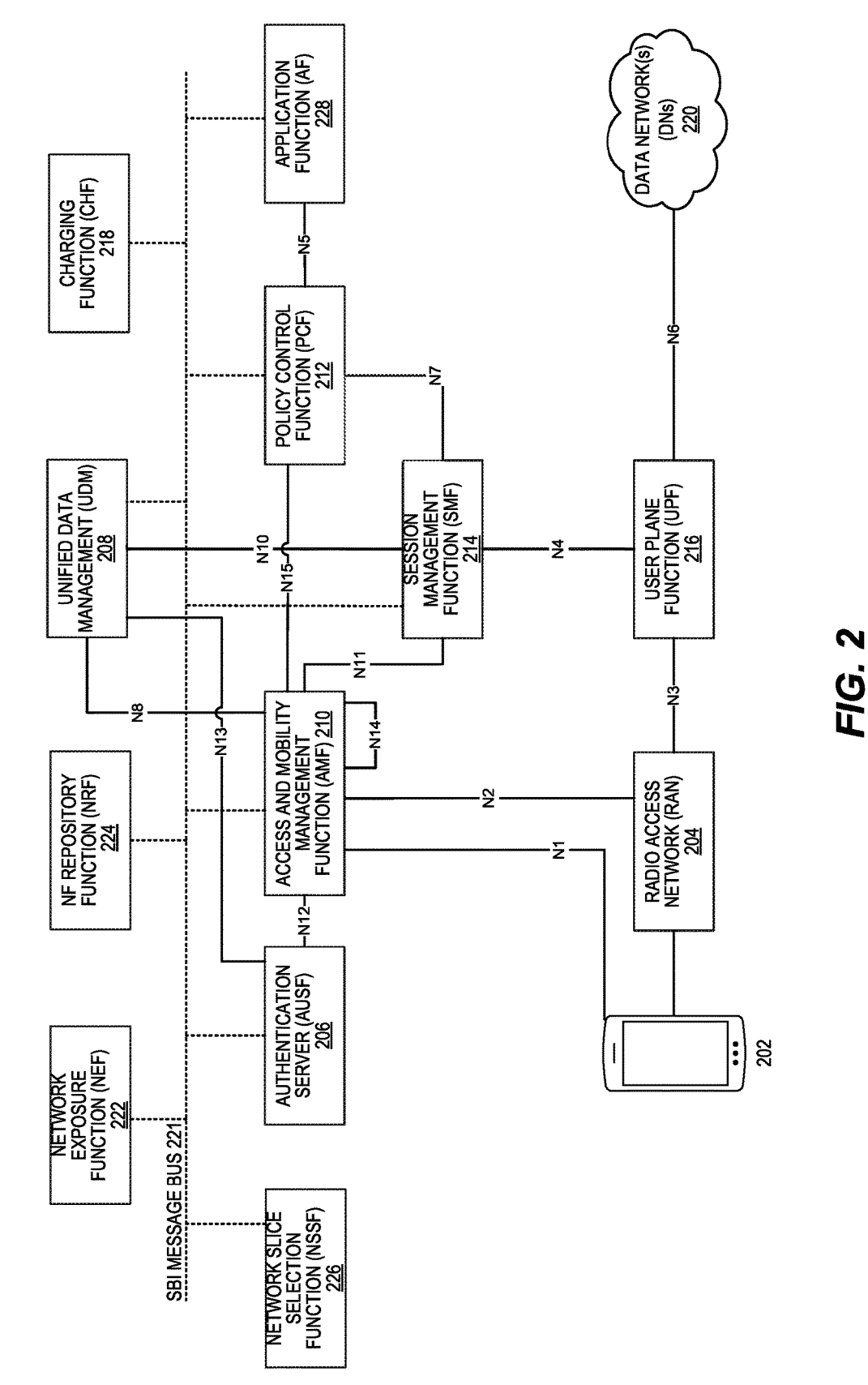
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example XR-Based Improvements for Remote Drone Operation

Example implementations improve remote operation of drones via XR-based enhancements of drone video feeds and streams. Video streams over networks (e.g., including satellite nodes of a network) places heavy load on the network and occupy massive bandwidth. Further, with drone traveling over long distances, a drone frequently operates in cell edge conditions or locations. Example implementations address these technical challenges by reducing a volume of data needed from a drone in order to safely, reliably, and accurately operate the drone. Lightweight video data can be streamed from the drone via the network, and the video data can be locally supplemented, augmented, filtered, and/or the like at a remote control station with visual XR data in a corresponding XR environment. In particular, the virtual XR environment can correspond at least in part with the real-world environment in which the drone is located and of which the video data captures; for example, the virtual XR environment is or includes a digital twin environment. In order to provide the correspondence between the virtual XR environment and the real-world environment, the virtual XR environment can be generated using spatial computing techniques that map (e.g., in three-dimensional space) the real-world environment based on sensor data collected by drones, user/mobile devices, satellites (e.g., low earth orbit (LEO) satellites), aircraft or other vehicles, and/or the like.

This combination of drone video data with visual XR data provides a useful solution in example scenarios in which the drone video data is corrupted, low quality, and/or low visibility. Additionally, other contextual information such as sensor and instrument information and navigational information can be layered over the video data streamed from the drone, for improved information communication to a drone operator.

Figure 3:
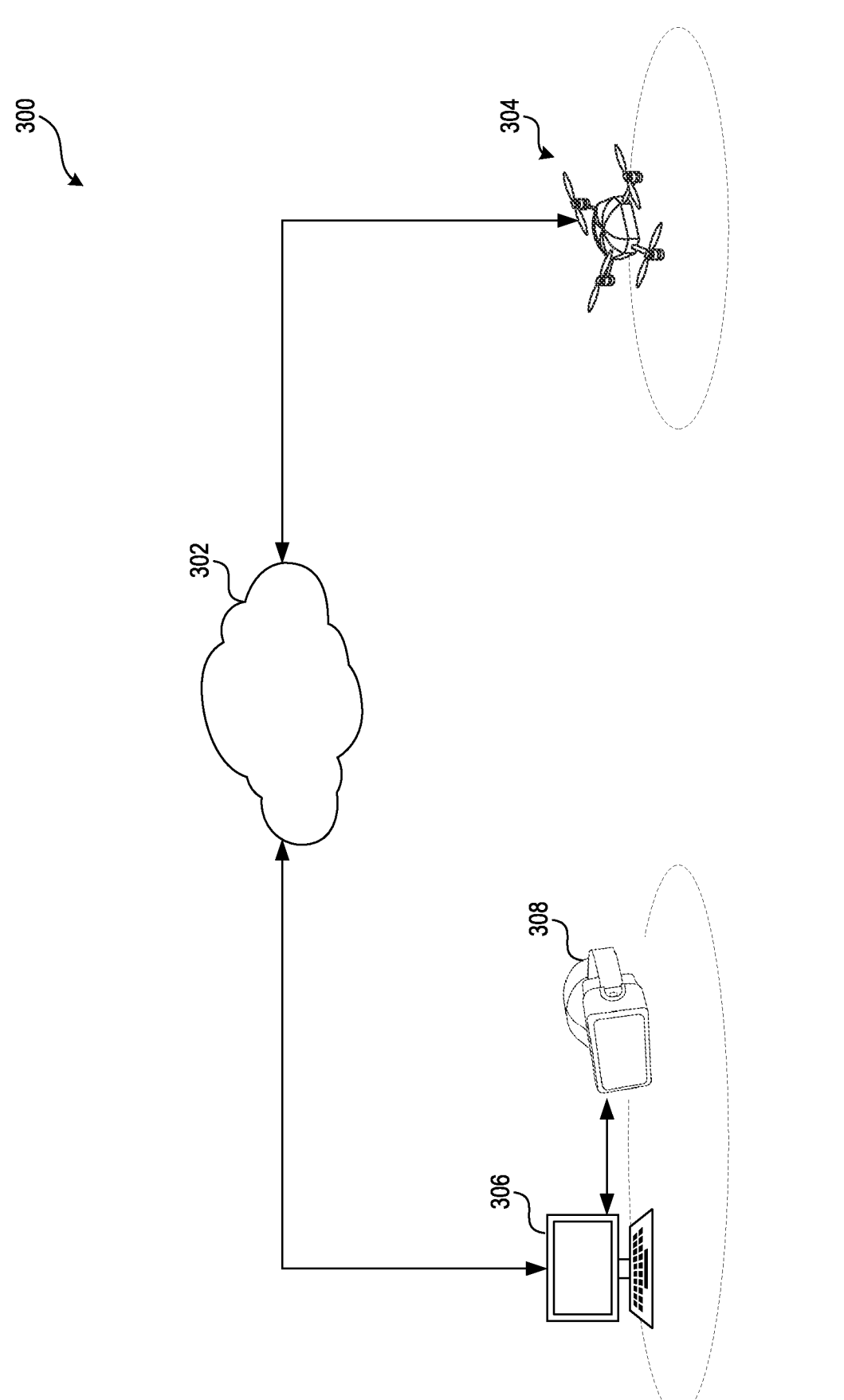
FIG. 3 is a block diagram that demonstrates remote and/or BVLOS operation of a drone by a remote control system via a wireless cellular network.

FIG. 3 is a block diagram that illustrates a system 300 for remote and/or BVLOS operation of a drone (or other remotely-controlled apparatus) with XR-based improvements. Extended reality (XR) generally refers to a (visual, auditory, haptic, and/or the like) merging of physical real-world objects and features and virtual digital-world objects and features. Some virtual digital-world objects can correspond to physical real-world objects, and a virtual XR environment can be a reconstruction or representation of a physical or geographic real-world area. XR can generally include mixed reality (MR) applications, augmented reality (AR) applications, virtual reality (VR) applications, and the like. According to the present disclosure, drone video data capturing a physical real-world is merged with a virtual XR environment in order to improve network communications and enhance drone operation.

In FIG. 3, a wireless cellular network 302 enables remote and BVLOS communication between a drone 304 and a remote control station 306. The wireless cellular network 302 can embody the wireless telecommunication network described with FIGS. 1 and 2. For example, the wireless cellular network 302 is a 5G cellular network and enables remote and BVLOS operation of the drone 304 while the drone 304 and the remote control station 306 are located in different cells of the network and while the drone 304 is in cell edge locations.

In some examples, the drone 304 is an unmanned aerial vehicle that includes components that enable aerial flight and maneuvering. In some examples, the drone 304 is a land-based vehicle (e.g., a car, a truck), a water-based vehicle (e.g., a boat), and/or the like. In some examples, the drone 304 includes an onboard computer used for operating components of the drone 304 to maneuver and navigate the drone 304. For example, the drone 304 is an autonomous or semi-autonomous vehicle and includes the onboard computer and other subsystems that enable the drone 304 to autonomously or semi-autonomously travel from one point to another. In some examples, the drone 304 is a stationary apparatus with movable components for carry out some functionality. For example, the drone 304 is a stationary arm that can be operated to articulate to grasp objects, deposit objects, and/or the like. According to example implementations, the drone 304 includes components for communicating via the wireless cellular network 302. For example, the drone 304 includes one or more radio transceivers configured to interface with base stations of the wireless cellular network 302 in order to transmit and receive data. In an example, the drone 304 includes a 5G wireless radio transceiver.

The remote control station 306 is a computing system used to communicate with the drone 304 and remotely operate the drone 304. The remote control station 306 is configured to and includes components for transmitting and receiving data via the wireless cellular network 302. In some examples, the remote control station 306 can be a server system, a desktop computer, a laptop computer, a mobile phone, a tablet computer, or any other computing device. The remote control station 306 is configured to transmit commands or control data to the drone 304 via the wireless cellular network 302 and receive sensor data, video data, telemetry data, and the like from the drone 304 via the wireless cellular network 302.

In some implementations, the wireless cellular network 302 is configured to facilitate multi-slice communication between the remote control station 306 and the drone 304. For example, the wireless cellular network 302 is a 5G network that is configured with multiple slices, such as slices for enhanced mobile broadband ("eMBB"), ultra-low latency ("URLLC"), and massive machine-type communications ("mMTC"). In some implementations, commands and control data sent by the remote control station are transmitted via a particular slice of the wireless cellular network 302 configured with a high priority and low latency, and sensor data sent by the drone is transmitted via another slice of the wireless cellular network 302 that is configured with a relatively lower priority and a relatively higher latency.

In connection with commanding and operating the drone 304, the remote control station 306 is configured to implement XR-based improvements according to the present disclosure. In particular, the remote control station 306 is configured to receive video stream data from the drone 304 and combine the video stream data with XR visual data from a virtual XR environment to generate drone perspective visual data for display to a user (e.g., a drone pilot, a drone operator, a drone spectator). Thus, the remote control station 306 is configured to communicate with an XR display device 308 that is configured to display visual data to a viewer/user. In some implementations, the XR display device 308 is a head-mounted display (HMD) device worn on a head of a viewer/user and includes components for displaying computer-generated content in an immersive manner (e.g., spanning a maximum field-of-view of the viewer/user). In some examples, the XR display device 308 is a hand-held device, such as a tablet or mobile phone, or any computing device (e.g., a laptop, a desktop) that includes a display that can display visual data generated to include physical objects and virtual objects in an extended reality manner.

In some examples, the remote control station 306 is configured to communicate data to and from the XR display device 308 through a wireless connection, for example, a local area connection (as shown in the illustrated example), or a connection facilitated by the wireless cellular network 302. The communication can be, for example, via a Wi-Fi connection, Bluetooth or Bluetooth Low Energy (BLE) connection, Ethernet connection, cable connection, digital subscriber line (DSL) connection, cellular connection (e.g., 3G, LTE/4G, 5G or 6G), or the like, or a combination thereof. The data can be any kind of data, such as visual data, image data (e.g., still images and/or full-motion video, including 2D and 3D images), image sets, sensor data (e.g., LiDAR data), audio, multimedia, voice, and/or any other type(s) of data.

The remote control station 306 can include a display (e.g., a display) that is configured to display content (e.g., graphical user interfaces (GUIs)) on a display as well as output audio content (e.g., via speakers). The XR display device 308 can include a near-to-eye display system that can include one or more displays and optical components for displaying computer-generated content in an immersive manner. The XR display device 308 can also include one or more audio input and output devices (e.g., one or more microphones and one or more speakers). The XR display device 308 can include components such as light-emission elements (e.g., light-emitting diodes (LEDs)), waveguides, and processing electronics. XR display devices can further include one or more imager devices to generate images (e.g., stereo pair images for 3D vision) in accordance with the environment of a user using the XR display device, based on measurements and calculations determined from the components included in the XR display device. The XR display device 308 can also include a depth-sensing system that resolves the distance between the XR display device worn by a user and the physical surfaces of objects in the user's immediate vicinity (e.g., walls, furniture, people, and other objects). The XR display device 308 can be a standalone device that is capable of without the need of another device or computer (e.g., the remote control station 306) and can communicate via the wireless cellular network 302 with the drone 304, in some examples.

While not explicitly shown in FIG. 3, additional computing devices and systems can be used with the remote control station 306 and the XR display device 308 to implement the present technology, depending on the example. In an example, the remote control station 306 is additionally connected to a separate microphone device configured to detect vocal utterances from a user. In an example, the remote control station 306 is additionally connected to a handheld controller (e.g., including a plurality of joysticks, buttons, switches, and/or the like) via which a user can input controls to command and maneuver the drone 304. In an example, the remote control station 306 includes peripheral interfaces (e.g., a keyboard, a mouse, a joystick, a microphone) via which the user can provide inputs for command and control of the drone 304. In some examples, a local area network router device (e.g., a Wi-Fi router, a 5G Internet router) facilitates communications between the remote control station 306, the XR display device 308, and/or the wireless cellular network 302.

Figure 4A:
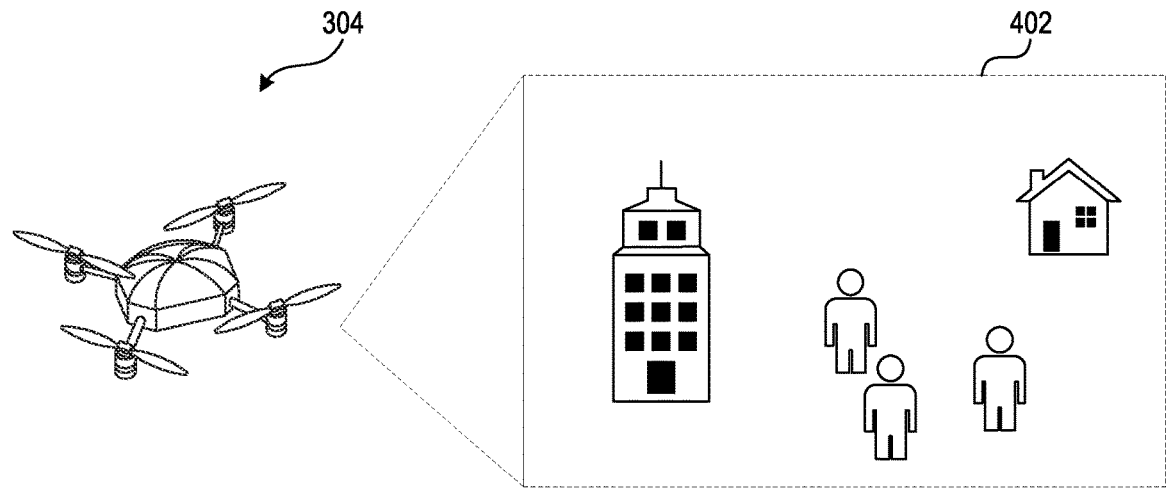
FIGS. 4A and 4B illustrate a XR-based perspective view for operation of a drone via a wireless cellular network.
Figure 4B:
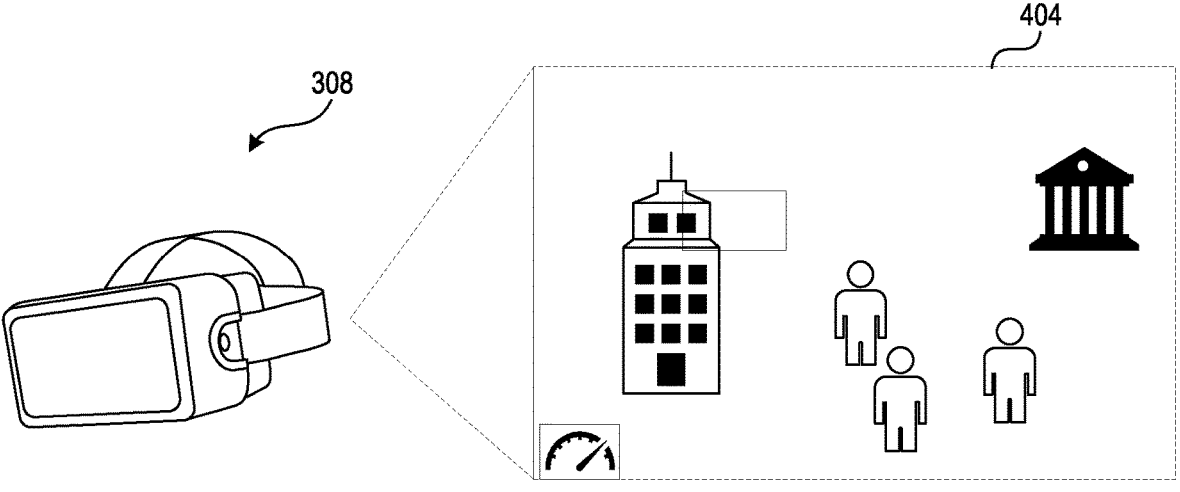

FIGS. 4A and 4B illustrate example techniques for lightening network load and network traffic for a wireless cellular network during remote and BVLOS drone operation. In FIG. 4A, a drone 304 captures camera visual data 402 (e.g., image data, video data, video stream data) of its surrounding physical world or environment. The drone 304 includes one or more camera devices or image sensing devices configured to capture the camera visual data 402 that depicts the physical objects and environment surrounding the drone 304. In some examples, the one or more camera devices include one or more of: image cameras, video cameras, night-vision cameras (e.g., thermal cameras, infrared cameras), stereoscopic cameras or 3D cameras, fisheye cameras, 360 degree cameras, cameras of different image quality (e.g., 1080p resolution, 4 k resolution), and the like.

In some implementations, the drone 304 further includes various sensors that can generate parameter data related to the drone 304, the physical environment, and the drone's position in the physical environment. For example, the drone 304 includes one or more of the following sensors, instruments, and devices: light detection and ranging (LiDAR) sensors, radar devices, gyroscopes, temperature sensors, windspeed sensors, barometers, altimeters, and global navigation satellite system (GNSS) devices. Sensor data collected by these sensors, instruments, and devices can be indicative of the movement and/or orientation of the drone 304. In some implementations, the drone 304 collects sensor data via onboard sensors, instruments, and devices while collecting the camera visual data 402 via the onboard camera devices.

In FIG. 4B, an XR display device 308 displays drone perspective visual data 404 that is generated (e.g., by a remote control station 306, by the XR display device 308) based on the camera visual data 402 collected by the drone 304. As demonstrated in FIGS. 4A and 4B, the drone perspective visual data 404 displayed by the XR display device 308 is representative of the visual data 402 collected by the drone 304. In some examples, the drone perspective visual data 404 includes the camera visual data 402 and layers additional visual features over the camera visual data 402. For example, the drone perspective visual data 404 includes an instrument-panel overlay that visually indicates the sensor data collected by the drone 304 (e.g., a speed of the drone, an altitude of the drone). In an example, the drone perspective visual data 404 includes a map overlay the visually indicates a location of the drone 304 with respect to a mapped portion of the physical environment. The drone perspective visual data 404 can include other overlays depending on the example, such as navigational overlays (e.g., virtual "lane" markers or "border" edges displayed with respect to the physical environment), information-label overlays (e.g., display pop outs that label recognized objects in the camera visual data 402), and the like. Other example overlays can include communication messages between other drones (e.g., V2V or peer-to-peer communications, C2V2X communications) located nearby, messages between control stations and other drones, and the like.

In particular, the drone perspective visual data 404 includes XR visual data from a virtual XR environment that corresponds to the physical real-world environment captured in the camera visual data 402. In such examples, the drone perspective visual data 404 can supplement or combine the camera visual data 402 with the XR visual data. For example, a particular field-of-view of the drone perspective visual data 404 includes the camera visual data 402 (or a portion thereof), and the XR visual data supplements another field-of-view in the drone perspective visual data 404. Thus, the drone perspective visual data 404 can be generated to have a 360 degree field-of-view, based on supplementing camera visual data that has a sub-360 degree field-of-view with XR visual data from the virtual XR environment. As another example, physical objects and features that are beyond a threshold range in the camera visual data 402 (and thus being depicted at a lower resolution) are replaced in the drone perspective visual data 404 with corresponding virtual objects and features from the virtual XR environment. In yet another example, virtual objects that have no corresponding physical object in the real-world environment are included in the drone perspective visual data 404. Such virtual objects can include virtual avatars associated with other XR users present in the virtual XR environment, virtual displays and billboards, virtual simulations of other drones (e.g., in a virtual drone racing setting), and/or the like.

In some examples, the drone perspective visual data 404 is entirely or significantly composed of the XR visual data, and the camera visual data 402 is used to obtain the XR visual data from the virtual XR environment. For example, the camera visual data 402 is used to localize the drone 304 (or its real-world location) to a corresponding virtual location in the virtual XR environment based on the objects captured in the camera visual data 402 and the relative distances between them. Similarly, certain objects in the camera visual data 402 can be entirely replaced with corresponding virtual objects from the virtual XR environment. In this way, certain objects in the real-world environment can be abstractly represented (e.g., to reduce visual clutter, to reduce computational intensity), censored, and/or the like.

Generating the drone perspective visual data 404 from the XR visual data is particularly useful when the camera visual data 402 has low visibility and/or low quality and may be generally unreliable for drone operation. Thus, in some implementations, the drone perspective visual data 404 is generated to replace the camera visual data 402 and can be provided to an autonomous or semi-autonomous controller of the drone. For example, while an autonomous controller (e.g., that implements an image classification, object recognition, and/or machine learning model) may fail to identify objects in the camera visual data 402, the autonomous controller can more accurately discern objects in the drone perspective visual data 404 and autonomously operate the drone accordingly.

FIG. 5 illustrates a flow diagram for example operations that improve drone operation and improve the use of a wireless cellular network for the drone operation. According to example implementations, the example operations can be performed by a remote control station (e.g., the remote control station 306 in FIG. 3), a XR display device (e.g., the XR display device 308 in FIG. 3), a user device connected to the remote control station and/or the XR display device, a cloud computing system in communication with an XR display device, one or more distributed computing devices in or connected to the wireless cellular network, and/or the like. For purposes of this description, the example operations are described with respect to a remote control station.

At 502, the remote control station receives local sensor data from a drone via a wireless cellular network. The local sensor data is locally captured or collected by onboard devices on the drone. The local sensor data can include video streams or image data from onboard cameras on the drone, as well as telemetry data, geolocation data, and/or the like. In some examples, the local sensor data is collected by sensor devices not onboard the drone. For example, the local sensor data is collected by Internet-of-Things (IoT) devices located near the drone, by one or more other drones (e.g., drones traveling with the drone, a leader drone that captures the sensor data for the drone), and/or other devices or systems with which the drone can be in communication.

In some implementations, the remote control station receives video streams that span a particular field-of-view of the drone according to a field-of-view in which the XR display device is oriented. In order to reduce an amount of data needed to be captured by the drone, the remote control station can determine a field-of-view currently spanned by the XR display device and indicates the field-of-view to the drone via the wireless cellular network. In response, the drone captures and transmits video streams for the indicated field-of-view and can refrain from capturing and transmit extraneous visual data outside the indicated field-of-view.

In some examples, the remote control station can receive local sensor data from the drone and otherwise communicate with the drone via a satellite network. For example, the drone is located outside a coverage area of a terrestrial network of the wireless cellular network, and the wireless cellular network provides communications between the drone and the remote control station via satellite nodes of the wireless cellular network, via a satellite network portion of the wireless cellular network, and/or the like. In such examples, one or more satellites of the wireless cellular network can, in addition to communicating the local sensor data, provide location and positioning telemetry of the drone to the remote control station. For example, a network satellite can determine a location estimate of the drone, receive sensor data from the drone, and transmit both the location estimate and the sensor data to the remote control station.

At 504, the remote control station maps a real-world drone location to a virtual location within a virtual XR environment that corresponds to a physical real-world environment in which the drone is located. In some examples, the remote control station maps the real-world drone location to the virtual location using the local sensor data received from the drone. For example, geolocation data that estimates the drone location with respect to the physical real-world environment is used to position the drone at a virtual location within the virtual XR environment, and the geolocation data corresponds to locations at which the image data was captured by the drone. As another example, the image data and video streams captured by the drone are used to map the real-world drone location to the virtual location based on object/image matching techniques. In particular, according to objects captured in the video streams, the remote control station can determine the virtual location relative to corresponding virtual objects in the virtual XR environment.

In some examples, the drone is operated according to a preplanned path. The remote control station can then determine the virtual location based on the preplanned path of the drone. The remote control station can improve an accuracy of the virtual location based on comparing the image data or video streams from the drone with reference images previously collected along the preplanned path.

At 506, the remote control station generates drone perspective visual data according to XR visual data obtained from the virtual XR environment. The XR visual data corresponds to the virtual location in the virtual XR environment. For example, the XR visual data captures a portion of the virtual XR environment from the virtual location with an orientation corresponding to that of the visual data received from the drone. In some examples, the XR visual data captures virtual objects in the virtual XR environment from a perspective view of the virtual location. In some examples, the remote control station generates the drone perspective visual data based on generating one or more overlays for a video stream from the drone. The remote control station can select a particular video stream from the drone (e.g., based on an image quality measure or a visibility measure) and generate XR-based overlays for the particular video stream. For example, the particular video stream is a night vision (e.g., thermal, infrared) video stream, and the remote control station generates the drone perspective visual data to include XR-based overlays for the night vision video stream. The XR-based overlays can include virtual objects corresponding to physical objects not well detected in the night vision video stream (or other video streams), visual data that emphasizes physical objects present in the particular video stream, and/or the like.

In some implementations, the remote control station receives the XR visual data from an XR system in communication with the remote control station (e.g., via the wireless cellular network), the XR system implementing an XR engine that generates, executes, runs, and/or maintains the virtual XR environment. In some examples, the remote control station generates the virtual XR environment (e.g., a digital twin environment) for an area through which a preplanned drone path extends, prior to the drone beginning to travel. In some implementations, the remote control station generates or obtains the XR visual data based on locally implementing an XR engine (e.g., a game engine such as Unreal Engine or Unity Engine) that provides the virtual XR environment at the remote control station. In some implementations, the virtual XR environment is generated based on sensor data collected by drones previously traversing the real-world environment. For example, the real-world environment is mapped by multiple drones using radar devices, image sensing devices, LIDAR devices, and/or the like in order to construct the virtual XR environment. In some implementations, the virtual XR environment is generated from three-dimensional sensor data collected by vehicles traversing the real-world environment, such as LEO satellites, airplanes, helicopters, and/or the like. These vehicles can collect three-dimensional sensor data such as 3D volumetric video, light detection and ranging (LiDAR) data, topography data, radar data, and/or the like. Using the three-dimensional sensor data, the XR engine can execute computing spatial techniques (e.g., object detection/classification/registration/tracking, surface mapping, topology mapping) can be performed to generate the virtual XR environment as a digital twin of the real-world environment.

In some implementations, the drones travel along predetermined corridors or highways defined by regulations and legal constraints. In such examples, a predetermined drone corridor can correspond to a virtual XR environment generated based on the sensor data collected by drones traveling along the predetermined drone corridor. With a virtual XR environment corresponding to a predetermined drone corridor or highway, an entire geographical area or region does not need to be captured in a larger virtual environment. Accordingly, a virtual XR environment corresponding to the predetermined corridor or highway along which a drone will be traveling can be preloaded or prestored on a local memory device of the drone and/or a local memory device of the remote control station. By doing so, the virtual XR environment can be more accurately generated as a true-to-scale digital twin of the real world environment.

In some implementations, the generation of the XR-based drone perspective visual data is triggered based on an unreliability of the video streams received from the drone. The remote control station can perform a threshold processing and evaluation of the video streams, and upon determining that an image quality or visibility of the video streams is below a threshold, the remote control station generates the drone perspective visual data to replace or supplement the video streams to improve the image quality or visibility.

At 508, the remote control station provides the drone perspective visual data for display in an XR display device. In some examples, the remote control station provides a portion of the drone perspective visual data corresponding to a present field-of-view and orientation of the XR display device.

In some implementations, the remote control station additionally or alternatively provides the drone perspective visual data to an autonomous or semi-autonomous controller of the drone, the autonomous or semi-autonomous controller being configured to remotely operate the drone based on visual data (e.g., the drone perspective visual data, camera visual data captured by the drone).

FIG. 6 illustrates a flow diagram for example operations that improve drone operation and improve the use of a wireless cellular network for the drone operation. The example operations are performed by an onboard computer of the drone.

At 602, the onboard computer stores a preplanned flight path for navigating the drone. The preplanned flight path can extend through a real-world area or environment that has a corresponding virtual XR environment.

At 604, the onboard computer collects image data as the drone travels along the preplanned flight path through the real-world area.

At 606, the onboard computer filters the image data to reduce an amount of data transmitted over a wireless cellular network to a remote control station. The present disclosure includes various techniques for filtering the image data to reduce transmitted data. In an example, the onboard computer can receive an indication of a particular field-of-view that will be displayed to a remote operator or user, and the onboard computer selects a portion of the image data that corresponds to the particular field-of-view. In an example, the onboard computer compares the image data with historical image data collected along the preplanned flight path. For example, the onboard computer can subtract the image data from the historical image data to obtain "delta" image data that is lightweight for transmission via the wireless cellular network. The "delta" image data can be used to reconstruct visual data at a remote control station with virtual XR data.

At 608, the onboard computer transmits the filtered image data to the remote control station via the wireless cellular network.

Example Voice-Based Improvements for Remote Drone Operation

The present disclosure also improves drone operation based on integrating voice or vocal control of drone maneuvers. With example implementations, a drone operator can use voice commands for coarse-resolution or abstract drone operations, and one or more models translate the voice commands to fine-resolution drone command data transmitted to and acted on by an onboard computer of a drone. Example implementations reduce an amount of inputs needed from a drone operator to operate a drone and enable diverse and simultaneous command input to complexly maneuver the drone. For example, a drone operator can provide voice commands in addition to physical inputs via hardware peripherals (e.g., joysticks). In example implementations, voice-integrated improves autonomous and semi-autonomous operation of a drone, in which the onboard computer of the drone locally operates subsystems (e.g., motors, power subsystems, mechanical subsystems) to maneuver the drone, and the voice commands can be used to alter and specify autonomous maneuvers.

Voice-based improvements can be implemented in the example shown in FIG. 3, in which a drone is controlled beyond a visual line-of-sight of a remote control station via a wireless cellular network. Example implementations disclosed herein can also be implemented in other drone control systems, such as one example in which the drone and a remote control station engage in peer-to-peer radio frequency (RF) communications, another example in which the drone and the remote control station communicate with one another at least in part via a Wi-Fi or WLAN network, and yet another example in which the drone is operated within a visual line-of-sight of the remote control station.

Figure 7:
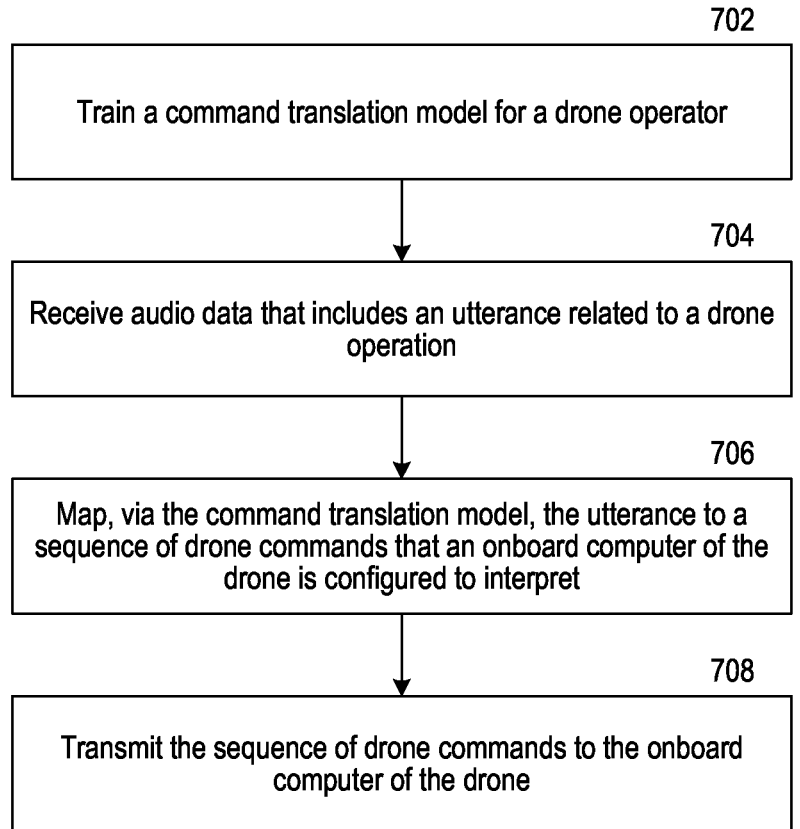
FIG. 7 is a flow diagram that illustrates example operations for voice-based improvements to autonomous and/or semi-autonomous drone operation via a wireless cellular network.

FIG. 7 is a flow diagram that illustrates example operations for implementing voice control for remote drone operation The example operations can be performed by any one or more computer systems or computing devices involved in the drone operation, including any one or more of a computer (e.g., a desktop, a laptop), an onboard computer located on the drone, a controller device manually operated by a pilot, a XR display device used (e.g., worn) by the pilot, and/or the like. For example, the example operations are performed by a remote control station.

At 702, the remote control station trains a command translation model for a drone operator. The command translation model can include a natural language processing (NLP) model, a machine learning (ML) model, and/or the like. One or more models can be implemented (e.g., by the remote control station) to translate vocal commands to drone command data to transmit to the drone. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the models can include a neural network with multiple input nodes that receive audio data capturing a vocal utterance, text data of a transcription of the vocal utterance, and/or the like. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as a translation of the vocal utterance. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes voice commands as input and a desired output, such as drone commands that fulfill corresponding voice commands. A representation of a voice command, such as audio signal data or tokenized text data can be provided to the model. Output from the model can be compared to the desired output for that voice command and, based on the comparison, the model can be modified, such as by changing weights between nodes of the neural network or parameters of the functions used at each node in the neural network (e.g., applying a loss function). After applying the training data and modifying the model in this manner, the model can be trained to evaluate new voice commands. In some implementations, the model is trained in part to accurately transcribe vocal utterances from a drone operator to text that can be mapped to specific drone commands.

With the model, different semantic utterances can be consistently and accurately translated to specific and standard drone commands. For example, according to the training data, the model can accurately map climb, elevate, and go higher to a sequence of commands that cause the drone to maneuver to a higher elevation. In some implementations, the model is further trained based on operator-specific training sets that capture semantic preferences by a drone operator. For example, a given drone operator can frequently use the word climb when providing inputs to cause the drone to maneuver to a higher elevation, and the model is trained to specifically recognize the word climb in utterances from the given drone operator and generate the corresponding drone commands for causing the drone to maneuver to a higher elevation.

At 704, the remote control station receives or detects audio data that includes a vocal utterance related to a drone operation. The remote control station can detect the vocal utterance via a microphone device included in or connected to the remote control station. In some examples, the microphone device is included in an XR display device being worn and used by the drone operator. The vocal utterance is a voice command for abstractly or coarsely maneuvering or operating the drone. For example, the vocal utterance is climb to 40 feet, or accelerate, or capture an image over there, or the like.

At 706, the remote control station maps, via the command translation model, the vocal utterance to a sequence of drone commands that an onboard computer of the drone is configured to interpret. The drone commands can correspond to a library of predetermined commands and codes implemented by the onboard computer. For example, the drone commands are configured according to the Micro Air Vehicle Link (MAVLink) protocol.

At 708, the remote control station transmits the sequence of drone commands to the onboard computer of the drone. The drone commands can include a tag identifies a drone command as a voice-originated drone command and that enables prioritization of the voice-originated drone command relative to a controller-originated drone command. As such, the drone operator can use voice commands in addition to other inputs for operating the drone, and the remote control station can transmit drone commands originating from voice and from the other inputs to the drone. This enables diversification of inputs for drone operation and more precise drone maneuvering. For example, a drone operator can use voice commands to control drone movements in a Z-axis direction (e.g., elevation) while simultaneously providing input via a handheld controller for controlling drone movements in an X-Y plane. The remote control station can transmit the sequence of drone commands to the onboard computer via a wireless cellular network. In some examples, the remote control station transmits the drone commands via a particular slice of the wireless cellular network while receiving sensor data from the drone via another slice of the wireless cellular network.

At the drone, an onboard computer receives the sequence of commands and can modify a preplanned flight path or an autonomous maneuver according to the sequence of commands.

Example Computer Systems

Figure 8:
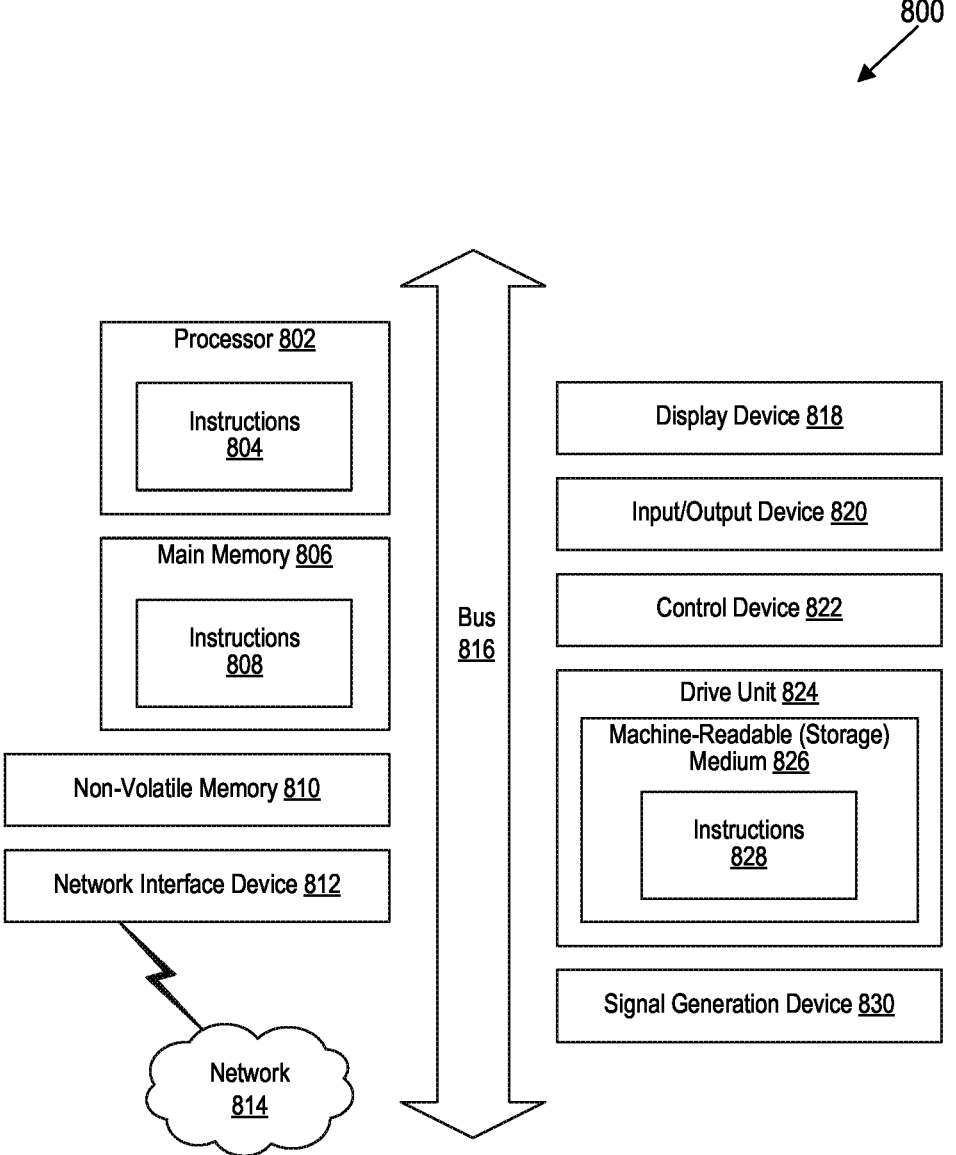
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

That which is claimed:

1. A ground control station (GCS) system for beyond-visual-line-of-sight operation of a drone vehicle, the GCS system comprising:

at least one processor; and at least one memory storing instructions that, when executed by the at least one processor, cause the GCS system to:

subsequent to indicating a display field-of-view (FOV) associated with an extended reality (XR) display device associated with the drone vehicle, configure a drone vehicle to capture a video stream with a reduced field-of-view (FOV) that is less than the display FOV, according to a constraint associated with a 5G telecommunication network coupling the GCS system with the drone vehicle;

receive, via the 5G telecommunication network, local sensor data collected at the drone vehicle, the local sensor data including: (i) the video stream with the reduced FOV that is collected by one or more onboard camera devices of the drone vehicle, and (ii) sensor data for geolocations of the drone vehicle at which the video stream is collected;

map a real-world location of the drone vehicle to a virtual location within an extended reality (XR) environment using the geolocation of the drone vehicle and an identification of corresponding objects captured in the video stream and represented in the XR environment, wherein the XR environment is a virtual reconstruction of a real-world geographic area in which the drone vehicle is located;

obtain, via an XR engine that provides the XR environment, XR visual data that corresponds to a perspective from the virtual location within the XR environment and to a supplemental FOV not included in the reduced FOV for the video stream captured by the drone vehicle, wherein the XR visual data includes at least one virtual object that does not exist in the real-world geographic area;

generate drone perspective visual data that combines the video stream having the reduced FOV with the XR visual data having the supplemental FOV; and provide the drone perspective visual data for display via an extended reality (XR) display device in communication with the GCS system.

2. The GCS system of claim 1, wherein the instructions further cause the GCS system to:

detect, via a microphone associated with the XR display device, a voice command for navigating the drone vehicle; and transmit control data to the drone vehicle based on the voice command to cause the drone vehicle to integrate the voice command with locally determined autonomous maneuvers.

3. The GCS system of claim 1, wherein the instructions further cause the GCS system to:

detect a voice command from a drone operator to which the XR display device is displaying the drone perspective visual data;

generate a sequence of drone commands from the voice command via a natural language processing (NLP) model, wherein the NLP model is trained to interpret the voice command from the drone operator based on an operator-specific training dataset that includes historical vocal utterances from the drone operator; and transmit the sequence of drone commands to an onboard computer of the drone vehicle.

4. The GCS system of claim 1, wherein the instructions further cause the GCS system to:

transmit, via the 5G telecommunication network, a plurality of drone commands to an onboard computer of the drone vehicle in response to detecting a voice command from a drone operator using the XR display device, wherein each of the plurality of drone commands includes a tag that identifies a drone command as a voice-originated drone command and that enables prioritization of the voice-originated drone command relative to a controller-originated drone command.

5. The GCS system of claim 1, wherein the video stream having the reduced FOV is received via a first slice of the 5G telecommunication network that is different than a second slice of the 5G telecommunication network via which the GCS system transmits commands to the drone vehicle, the second slice being configured with a higher network priority and a lower latency relative to the first slice.

6. The GCS system of claim 1, wherein the video stream having the reduced FOV is combined with the XR visual data having the supplemental FOV to result in a 360-degree FOV.

7. The GCS system of claim 1, wherein the drone perspective visual data includes at least one of:

a map overlay that includes an indication of the real-world location of the drone vehicle with respect to the real-world geographic area; or an instrument-panel overlay that indicates real-time telemetry of the drone vehicle that is obtained via the local sensor data received from the drone vehicle, the real-time telemetry including a drone vehicle speed, a drone vehicle altitude, and a drone vehicle orientation.

8. The GCS system of claim 1, wherein the one or more onboard camera devices include a night-vision camera and a standard camera, and wherein generating the drone perspective visual data includes a selection of a first video stream from the night-vision camera over a second video stream from the standard camera.

9. The GCS system of claim 1, wherein the real-world location of the drone vehicle is mapped to the virtual location within the XR environment further based on preplanned path information for the drone vehicle.

10. The GCS system of claim 1, wherein the real-world location of the drone vehicle is mapped to the virtual location based on referencing the video stream against reference video data that was collected by a second drone vehicle that previously traveled along a preplanned flight path along which the drone vehicle is currently being navigated.

\*   \*   \*   \*   \*